Patented Aug. 8, 1933

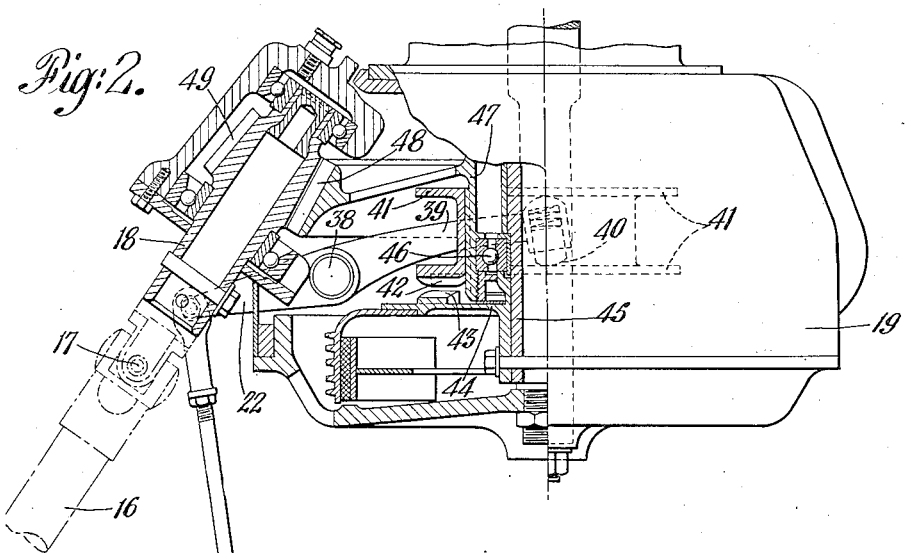
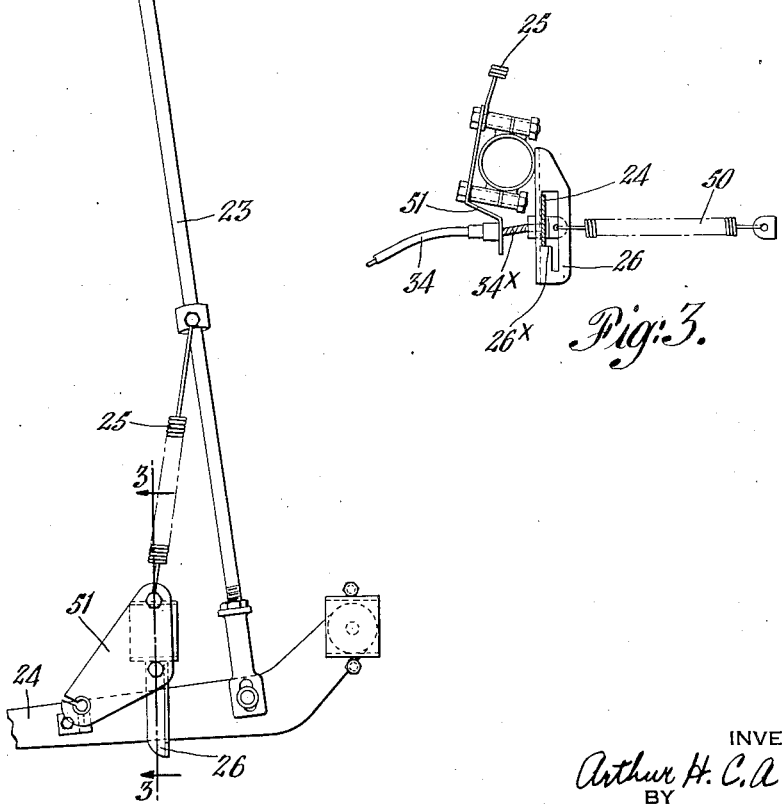

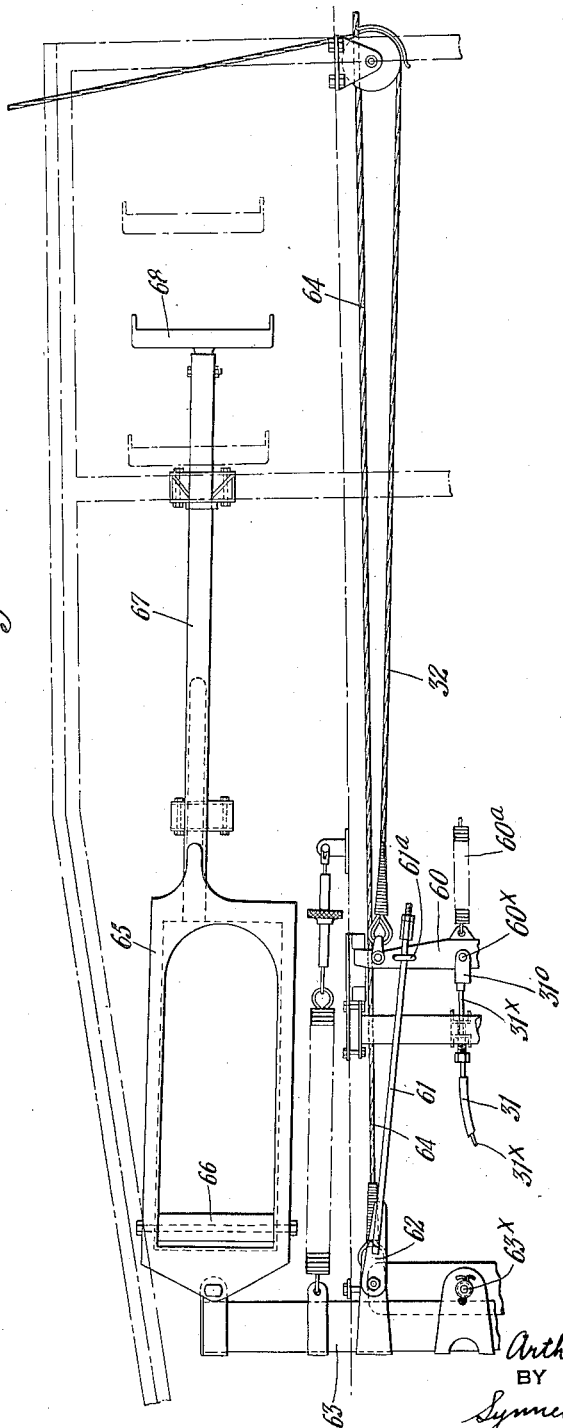

1,921,839

UNITED STATES PATENT OFFICE 1,921,839

AIRCRAFT HAVING FREELY ROTATIVE SUSTAINING WINGS

Arthur H. C. A. Rawson, London, England, assignor to Autogiro Company of America, Willow Grove, Pa., a Corporation of Delaware Application October 29, 1932, Serial No. 640,137, and in Great Britain November 19, 1931

12 Claims. (Cl. 244—19)

The present invention relates to aircraft having freely rotative sustaining wings normally driven in flight by the action of the relative wind. In such an aircraft the rotative wing system in general consists of a plurality of wings or blades attached to a central hub mounted for free rotation, the whole system of wings and hub being hereinafter referred to as a rotor. An aircraft of this type will also be provided with forward propelling means usually consisting of an engine and airscrew, the rotor being rotated in normal flight by aerodynamic forces alone. Before the aircraft can take flight it is necessary to impart to the rotor a certain degree of initial rotation.

It has already been proposed to provide drive transmitting means between the propelling means and the rotor, whereby the power of the propelling means may be applied to impart the necessary initial rotation, drive disconnecting means being included to render the rotor independent of the engine in flight.

For the purpose of getting the aircraft off the ground it is desirable to disconnect the drive between the engine and the rotor so that the full power of the engine may be applied to the propulsive airscrew during take-off.

An object of the present invention is the provision of a safety device adapted to prevent any attempt to take the machine off the ground with the drive from the engine to the rotor still engaged.

It is also known to provide aircraft in general with brakes acting on the running wheels of the craft and controlled by the pilot whereby the aircraft may be held stationary on the ground against the thrust of the airscrew.

According to the present invention, in an aircraft of the type referred to having drive transmitting means connecting the engine with the rotor and drive-disconnecting means, there is provided in combination with braking means for the running wheels an interconnection between the wheel braking and the rotor-drive-disconnecting means, so constructed, arranged and operating that on release of the wheel-brakes to allow the aircraft to move over the ground the drive from the engine to the rotor is automatically and completely disconnected.

The nature of the present invention will be more fully understood from the following description referring to the accompanying drawings which illustrate the preferred constructional embodiment thereof in an aircraft having a freely rotatable sustaining rotor of the type referred to.

In the drawings—

Figure 2 is a side view of certain of the upper parts of the mechanism shown in Figure 1, the view being partly in elevation and partly in vertical section;

Figure 3 illustrates a detail of the mechanism shown in Figure 2, the view being taken substantially as indicated by the section line 3—3 on Figure 2;

Figure 6 is a top or plan view of portions of the structure shown in Figure 1.

Figure 1:
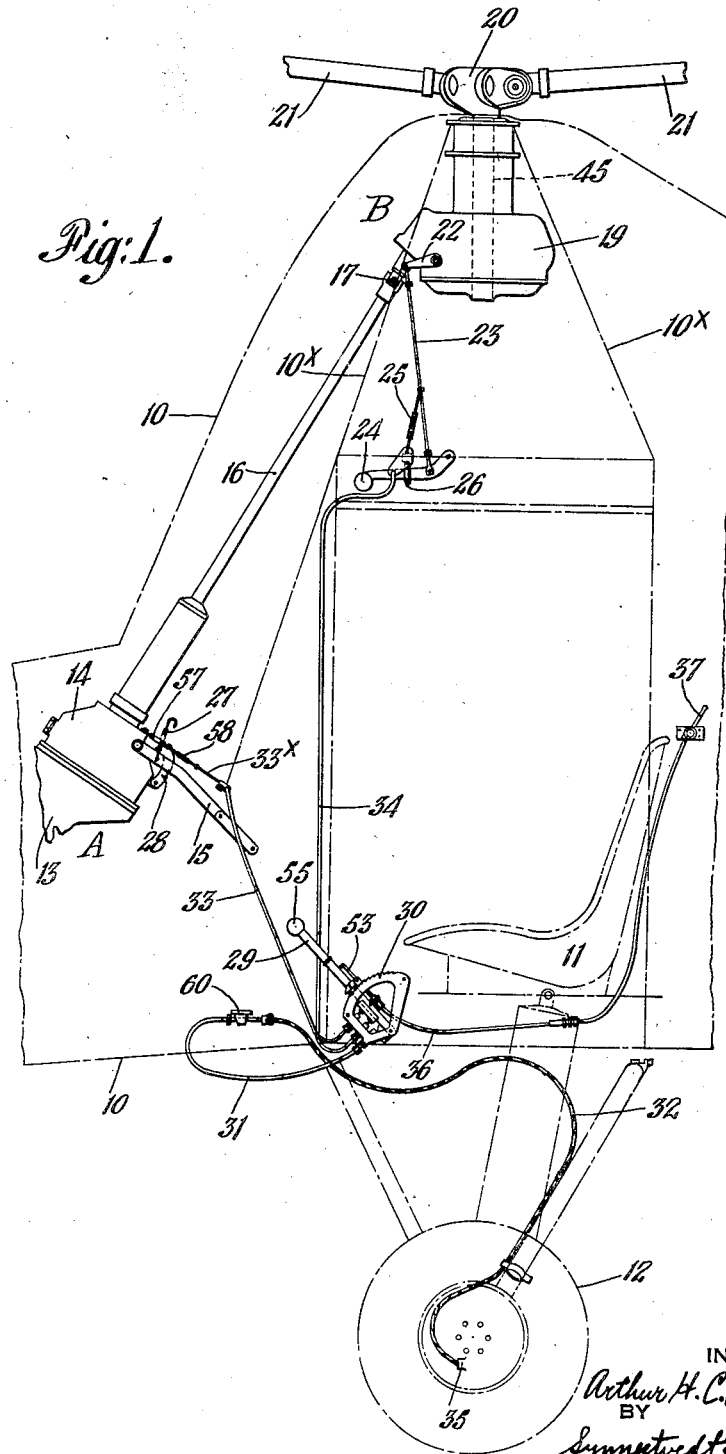
Figure 1 is a fragmentary side view of portions of an aircraft of the type above referred to having the mechanism of the present invention applied thereto.

Referring first to Figure 1, the outline of the aircraft is shown at 10 in dot and dash lines, the front and rear part of the aircraft being broken away. At 11 is indicated, also in dot and dash lines, the pilot's seat from which all the controls are easily accessible.

The main wheels of the under-carriage are shown at 12 and a rear portion of the forward propulsion engine appears at 13. At the top of the body is mounted a rotor including a hub 20 to which are articulated sustaining wings or blades, portions of which appear at 21.

The rotor hub 20 includes a downwardly extended axis member 45 which is mounted and supported in suitable bearings (not shown) housed in a casing 19, which in turn is secured to and supported by the structural members of the aircraft body, some of which are diagrammatically indicated at 10x.

The means for imparting an initial rotation to the rotor 20, 21 before taking flight, comprises lower and upper transmission units, generally indicated at A and B, interconnected by an oblique shaft 16. The lower transmission unit A preferably includes a reduction gear taking power from the crankshaft or one of the auxiliary drive shafts of the engine 13 and a friction clutch. These components are not shown in the drawings since the details thereof form no part of the present invention per se, but they are contained within the casing 14 bolted to the engine part 13. The friction clutch is engageable and disengageable by means of a hand lever 15.

The upper transmission unit B, which is more particularly illustrated in Figure 2, is housed within the casing 19 and receives the drive from the lower transmission unit A by means of the oblique shaft 16, a universal joint 17 and an extension shaft 18.

The upper transmission unit preferably includes a reduction gear and a clutch device, for example, a dog clutch, which is controlled by a hand lever 24 through a rod 23 and lever 22.

The controlling levers 15 and 24 of the friction and dog clutches are both biased to a disengaged position by means of springs 27 and 25 respectively. Means, however, are provided for temporarily holding these levers (15 and 24) in the positions for holding their respective clutches in engagement; these means, consisting respectively of a ratchet quadrant 28 and a notched gate 26. The hand lever 24 may be temporarily latched in position to engage the dog clutch by means of a pull rod or cable type of control, including a cable or rod 34x and tube 34 which are extended from this lever to the wheel brake control lever 29. Similarly, the quadrant 28, which is pivotally mounted as at 28x, may be displaced to cooperate with the hand lever 15 by means of pull cable or rod 33x and tube 33 which are extended from the quadrant to the wheel brake lever 29. Similar types of control elements may be extended from the lever 29 to the brakes for wheels 12, one of these being shown at 31—32 as being coupled with a wheel brake at 35.

The hand lever 29 works in a ratchet quadrant 30, the engagement of the ratchet 30 being controllable either by movement of the hand knob 55 or by means of a connection 36 from a hand lever 37. This latter is mounted behind the pilot's seat 11 but is accessible from a seat placed behind the pilot's seat, said second seat not being illustrated in the drawings. The purpose of this arrangement will hereinafter be more fully explained.

Referring to Figure 2 the extension shaft 18 carries the pinion 49 which meshes with a crown wheel 48, the latter being formed integrally with a sleeve 47 which is rotatably mounted by means of a bearing 46 on the axle 45 of the rotor.

Connection between the crown wheel 48 to the axle 45 for imparting the starting rotation is accomplished by engaging a dog clutch 42, 43, one part 43 of which is carried by a flanged member 44 bolted to the axle 45, the other part 42 being formed on a collar 41 which is slidably but non-rotatably mounted on the sleeve 47 as by a splined connection.

Engagement and disengagement of the dog clutch 42, 43 is effected by means of a member 40 disposed between the flanges of element 41 and mounted on the end of an arm 39 carried by a rocking shaft 38. The shaft 38 projects outside the casing 19 and has mounted thereon the lever 22 which is connected with the hand lever 24.

The spring 25 is attached at its upper end to the rod 23 and anchored at its lower end to a fixed part of the structure such as the device 51. As the spring 25 acts in tension it serves to bias the rod 23 in a downward direction, thus disengaging the clutch 42, 43 as will clearly be seen from an inspection of Figure 2.

To engage the clutch 42, 43 the hand lever 24 must be raised against the pull of the spring 25 and may be held in the raised position. Clutch engagement may be maintained by laterally displacing the arm of the lever 24 to engage a notch 26x of the gate device 26 as shown in Figure 3. This is effected by applying a tension to the rod or member 34x slidably mounted in tube 34 which is supported by an abutment plate 51. A tension spring 50 is attached to the lever 24 at the opposite side of the control lever and acts on release to pull the lever 24 off the notch 26x whereupon the spring 25 immediately acts to disengage the clutch 42, 43.

Figure 4:
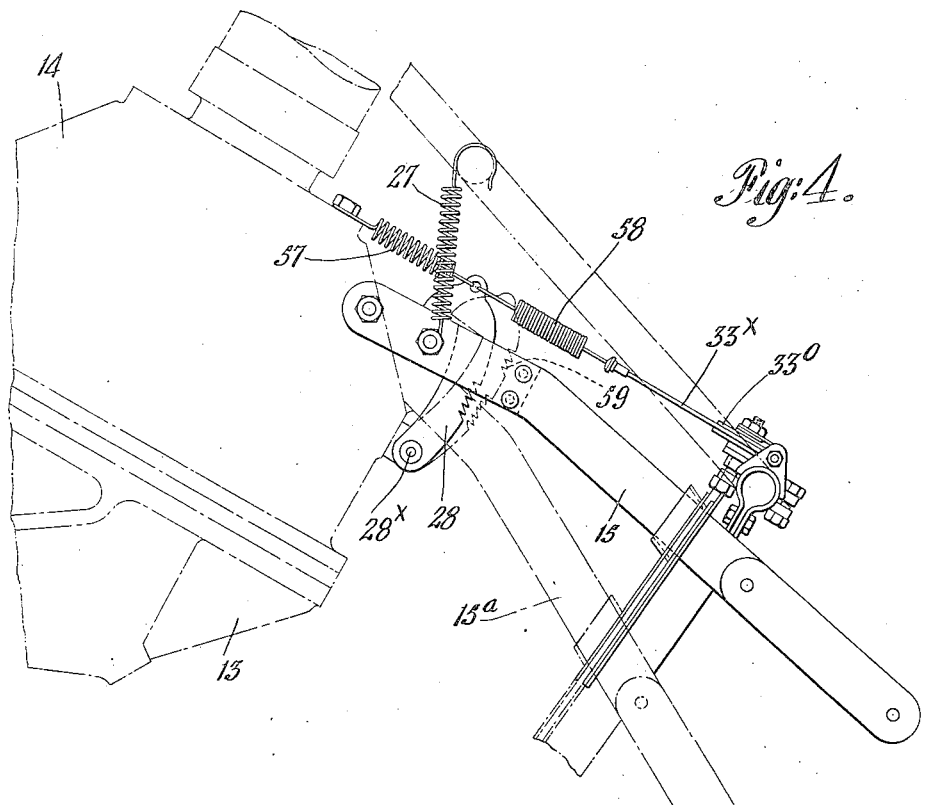
Figure 4 is a side elevational view of some lower parts of the power transmitting and control mechanism of the present invention.

Referring to Figure 4 the lever 15 controlling the friction clutch contained in the casing 14 of the lower transmission unit A is biased to disengaging position by the tension spring 27. The lever 15 carries a ratchet element 59 which is adapted to engage with the teeth of a toothed quadrant 28 pivoted about its lower end 28x.

The quadrant 28 is biased by means of a spring 57 to a position in which the ratchet 59 cannot engage therewith but is movable by means of the tension wire or rod 33x and a resilient spring connection 58 into engaging position. Both positions of the quadrant are shown in Figure 4, the clutch-engaged position being that illustrated in dot and dash lines at 15a.

When the quadrant is in the full line position, the hand lever 15 on being depressed to engage the friction clutch is retained in the engaging position by cooperation of the toothed quadrant 28 with the ratchet 59. Both positions of the hand lever 15 are shown in Figure 4.

The tension wire 33x passes over a pulley 33o and thereafter extends through tube 33 to the control lever 29.

Figure 5:
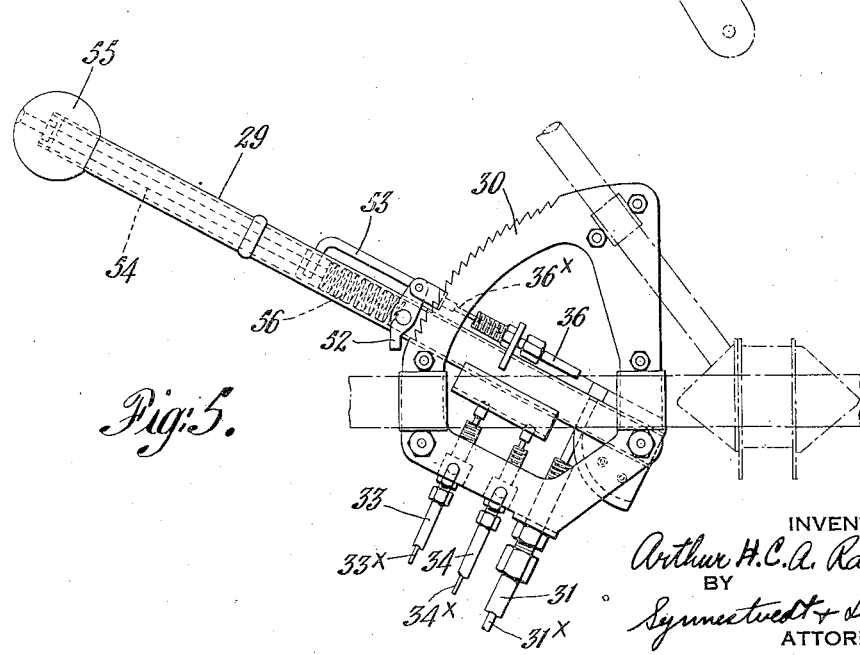
Figure 5 is a side elevational view of a control and actuating device for the wheel brakes of the craft, together with certain associated and interrelated parts of the mechanism of this invention applied thereto.

Referring to Figure 5, the hand lever 29 works in a ratchet quadrant 30 the lower part of which serves as a mounting or supporting means for the three control tubes 31, 33, 34. The elements 31x, 33x and 34x are secured to the lever 29 and respectively actuate the means for applying the wheel brakes and the means for holding the clutch controlling levers 15 and 24 in their engaged positions.

Engagement with the ratchet 30 is effected by means of a pivoted pawl 52 which is biased to engagement by means of a stirrup 53 and a compression spring 56 carried inside the shank of the control 29. Disengagement of the pawl 52 is effected either by depressing the hand knob 55 to which is secured an internal rod 54 engaging the stirrup 53 or by means of the pull rod control 36 whose tension member 36x is secured to the pawl 52.

Figure 6 shows the connections for applying the wheel-brakes. The tension member 31x which works in tube 31 is attached by means of a strap 31o and pin 60x to the middle of a floating crossbar 60 which is urged toward release position by spring 60a. Shackled to the outer ends of the latter are cables 32 which are led to the points 35 for attachment to the internal actuating means of the wheel brakes.

The crossbar 60 is connected by rods 61 and shackles 62 to the rudder bar 63 centrally pivoted at 63x and to which are shackled cables 64 extended for connection with the rudder of the craft.

The rudder bar 63 is operated by stirrups 65 in which are arranged pedals 66. Each stirrup 65 has a rear extension 67 carrying a pedal 68 conveniently situated for operation by an occupant of the rear seat.

It will be seen that when the floating crossbar 60 is in its normal position with the brakes released, the movements of the rudder bar 63 are communicated by means of the rod 61 to the crossbar 60 so that the wheel brakes are differentially applied by the cables 32.

The rods 61 are connected to the crossbar 60 in such a way as to operate in tension only, for example, by yoke 61a, so that when the crossbar 60 is pulled bodily forward by applying tension to the cable 31x, both wheel brakes are applied and the movements of the rudder bar are not transmitted to the brakes.

The operation of the arrangement is briefly as follows:—

Before beginning a flight the hand lever 29 is pulled back, thus tensioning all the control connections associated therewith. The connection 31, 31x pulls forward the floating crossbar 60 and thus applies both wheel brakes. The connection 33, 33x brings the toothed quadrant 28 into the engaging position while the connection 34, 34x overcomes the tension of the spring 50. The lever 29 may now be released since it will be held in position by the engagement of the pawl 52 with the ratchet 30.

The engine 13 having been started (if it was not already running) the clutches in the transmission units of the rotor drive are now engaged, to allow the engine to impart an initial rotation to the rotor. This is done by first pushing the hand lever 24 upwards to engage the dog clutch 42, 43, the arm of the lever 24 being securely lodged on the notch 26x of the gate 26 by the tension of the tension wire 34x.

Next the friction clutch contained in the case 14 is smoothly engaged by gently pressing down the hand lever 15 which is retained in the engaged position by means of the ratchet 59 and the toothed quadrant 28.

It may here be noted that in moving the lever 15 down, the ratchet teeth 50 spring over the teeth of the member 28 and this is rendered possible by the resilient connection 58 of the control wire 33x.

Both levers 24 and 15 may now be released with the drive to the rotor established and the engine throttle may be manipulated to speed up the rotor to the rate of rotation necessary for taking off.

By releasing the pawl 52 from the ratchet quadrant 30, which allows the lever 29 to move out of the brake applying position under the influence of spring 60a (Figure 6), the releasing of the lever 29 simultaneously effects the release of the holding means for the two clutches, since on releasing the tension of cable 33x, the spring 57 withdraws the quadrant 28 from the engaged position and releases the clutch engaging lever 15 for movement to disengaged position under the influence of spring 27. Also on releasing the tension of the cable 34x the spring 50 pulls the lever 24 off the notch 26x and frees it for movement to the position for disengaging the dog clutch 42, 43 under the influence of the spring 25.

Thus the action on releasing the wheel brakes before taking off automatically disconnects the transmission from the engine to the rotor.

It will further be seen that neither of the clutch operating levers 15 and 24 can be locked in engaged position unless the wheel brakes are at the same time applied.

The release of the pawl 52 can be effected either by pressing the knob 55 of the lever 29 or by manipulating the lever 37 from the rear seat.

This control is introduced for the purpose, more particularly, of flying instruction in which case the pupil will be seated in the front seat 11 and the instructor in a rear seat within reach of the lever 37. After seeing that the pupil has correctly performed the sequence of acts for applying the brakes, or engaging the two clutches and imparting the necessary rotation to the rotor, he can then himself, make sure that all brakes and clutches are released before the pupil takes the aircraft off.

From the foregoing it should also be apparent that the structure of the present invention provides a very effective interlock between the operation of the wheel brakes of the craft and the disengageable rotor-starter clutches. Applicant's mechanism, furthermore, is of relatively simple form and is substantially foolproof, with the result that an inexperienced pilot or a novice cannot take off from the ground with either one or the starter clutches engaged.

In addition to the foregoing highly advantageous interrelation of starter clutches and wheel brakes, attention is also directed to the fact that the normal rudder controls for the craft are so coupled with the wheel brakes as to provide for differential operation thereof when desired, for example, when taxiing on the ground. At the same time control or operation of the craft in general is materially simplified, especial attention being called to the provision of a brake control lever which is arranged to apply both wheel brakes and which, furthermore, does not in any way affect differential brake operation by the rudder pedals or stirrups when the hand control is moved to release position. By the foregoing arrangements, therefore, an operator need only pull or actuate the hand lever for the brakes when he desires to stop on the ground or remain stationary, as in using the rotor starter prior to take-off and, further, when the operator desires to steer the craft when taxiing it is only necessary to release the hand lever for the brakes and use the foot pedals in the same manner as is normally required for steering the craft in flight.

Attention is called to the fact that certain features of the rotor mounting arrangements and rotor driving and braking mechanisms more or less diagrammatically shown in the drawings of this application are more fully disclosed and are also claimed in one or more of the following copending applications: Cierva 496,872, filed November 20, 1930; Pecker 512,383, filed January 30, 1931; Pecker 545,451, filed June 19, 1931; Cierva 617,500, filed June 16, 1932; Cierva 631,355, filed September 1, 1932.

I claim:—

1. In an aircraft of the character described, a forward propulsion engine, a primary sustaining system comprising a rotor hub and rotary wings mounted above the body of the craft, a mechanism for initiating rotation of said wings prior to take-off from the ground including a drive connection extended between the engine and the rotor hub, a disconnectible clutch associated with said drive connection adjacent said hub, means for controlling engagement and disengagement of said clutch, alighting mechanism for the craft including a wheel with a brake, a control element for the wheel brake, and means for interrelating the operation of said control element and the clutch controlling means.

2. In an aircraft of the character described, a forward propulsion engine, a primary sustaining system comprising a rotor hub and rotary wings mounted above the body of the craft, a mechanism for initiating rotation of said wings prior to take-off from the ground including a power take-off device associated with the engine and a drive connection extended therefrom to the rotor hub, a pair of disconnectible clutch devices one associated with the drive connection adjacent to said power take-off device and the other associated with said drive connection adjacent to the rotor hub, alighting mechanism for the craft including a wheel with a brake, a wheel brake control element, and means operatively interrelating the action of said control element and said clutch devices and so constructed that upon release of the wheel brake said clutches are also automatically released.

3. In an aircraft of the character described, a forward propulsion engine, a primary sustaining system comprising a rotor hub and rotary wings mounted above the body of the craft, a mechanism for initiating rotation of said wings prior to take-off from the ground including a drive connection extended between the engine and the rotor hub, a disconnectible clutch associated with said drive connection adjacent said hub, means for controlling engagement and disengagement of said clutch, alighting mechanism for the craft including a wheel with a brake, a control element for the wheel brake, and means associated with said control element and the means for controlling said clutch so constructed and arranged that upon release of the wheel brake the clutch control is actuated to effect disengagement of the drive connection.

4. In an aircraft, a sustaining rotor, a forward propulsion engine, alighting wheels each having a brake, control mechanism for the brake including means providing for differential brake operation and a device providing for simultaneous brake operation, means for initiating rotation of the rotor prior to take-off from the ground including a drive connection extended between the forward propulsion engine and the rotor, rotor-drive-disconnecting means, and means interrelating the operation of the rotor-drive-disconnecting means and said brake control device so constructed and arranged as to interrupt the drive connection upon release of the brakes by said device, the differential brake control and the rotor-drive-disconnecting and interrelating means being so constructed as to provide for differential brake operation without influencing the rotor-drive-disconnecting means.

5. In an air craft having a forward propulsion engine and a primary sustaining system of rotary wings, power transmitting means between the engine and the sustaining rotor for initiating rotation of the rotary wings prior to take-off from the ground, a device for disconnecting the power transmission, alighting mechanism for the craft including at least a pair of wheels each with a brake, control mechanism for the wheel brakes, a rudder control for the craft differentially connected with the wheel brake controlling mechanism, whereby to provide for actuation of one brake or another in accordance with different actuations of the rudder control, an additional brake applying control member, and means interconnecting said control member and said disconnecting device, the means last mentioned being constructed and arranged to effect disconnection of the power transmission upon release of the brakes by said additional control member.

6. In an aircraft of the character referred to, a sustaining rotor, a disconnectible rotor starter, an alighting wheel with a brake, a manually operable control element for the wheel brake disposed for ready access by a pilot, means associated with said starter and said element operative upon release of the brake by the control element to disconnect the rotor starter, and remote control means for actuating said control element to release the wheel brake, the means last mentioned being extended for ready access at a point remote from the control element.

7. In an aircraft, a normally air driven sustaining rotor, a forward propulsion engine, a starter for initiating rotation of the rotor prior to take-off from the ground, said starter including a power interconnection between the engine and the rotor, means for making and breaking said interconnection, an alighting wheel for the craft with a brake therefor, a control member for actuating said brake, means for retaining the control member in brake-applied position, and means interrelating the operation of said make and break device for the power transmission and said control member for the brake, the last means being constructed and arranged to maintain the make and break device in position to complete the power interconnection when the control member is actuated to its brake-applied position.

8. In an aircraft, a normally air driven sustaining rotor, a forward propulsion engine, a starter for initiating rotation of the rotor prior to take-off from the ground, said starter including a power interconnection between the engine and the rotor, means for making and breaking said interconnection, an alighting wheel for the craft with a brake therefor, a control member for actuating said brake, means for retaining the control member in brake-applied position, and means interrelating the operation of said make and break device for the power transmission and said control member for the brake, the last means being constructed and arranged to maintain the make and break device in position to complete the power interconnection when the control member is actuated to its brake-applied position, together with means associated with said device, said control member and the means for interrelating their operation constructed and arranged to ensure actuation of the make and break device to interrupt the power interconnection upon actuation of the control member to brake-release position.

9. In an aircraft, a rotor system constituting a primary means of sustension for the craft, a forward propulsion engine, a starter for the rotor system including a power interconnection extended therefrom to said engine, a device for making and breaking said interconnection, landing gear for the craft including at least a pair of wheels each with a brake, a common control member for actuating the wheel brakes, and means interrelating the operation of said control member and said device constructed and arranged to ensure actuation of said device to break the power interconnection upon actuation of the control member to brake-release position.

10. In an aircraft, a rotor system constituting a primary means of sustension for the craft, a forward propulsion engine, a starter for the rotor system including a power interconnection extended therefrom to said engine, a device for making and breaking said interconnection, landing gear for the craft including a wheel with a brake, a hand operable control member for the brake disposed in the body of the craft for ready access by an operator or pilot, means normally tending to maintain said device in position to break the power interconnection, and means associated with said device and said control member including mechanism for locking or maintaining said device in position to make the power interconnection when said control member is actuated to brake-applied position.

11. In an aircraft, a rotor system constituting a primary means of sustension for the craft, a forward propulsion engine, a starter for the rotor system including a power interconnection extended therefrom to said engine, a device for making and breaking said interconnection, landing gear for the craft including a wheel with a brake, a hand operable control member for the brake disposed in the body of the craft for ready access by an operator or pilot, means normally tending to maintain said device in position to break the power interconnection, and means associated with said device and said control member including mechanism for locking or maintaining said device in position to make the power interconnection when said control member is actuated to brake-applied position, the means last mentioned further being constructed to release the make and break device upon actuation of the control member to brake-release position, whereby the means normally tending to maintain the make and break device in position to interrupt the power interconnection will, at that time, effect such interruption.

12. In an aircraft, a rotor system constituting a primary means of sustension for the craft, a forward propulsion engine, a starter for the rotor system including a power interconnection extended therefrom to said engine, a device for making and breaking said interconnection, landing gear for the craft including a wheel with a brake, a hand operable control member for the brake disposed in the body of the craft for ready access by an operator or pilot, means normally tending to maintain said device in position to break the power interconnection, and means associated with said device and said control member including mechanism for locking or maintaining said device in position to make the power interconnection when said control member is actuated to brake-applied position, the means last mentioned further being constructed to release the make and break device upon actuation of the control member to brake-release position, whereby the means normally tending to maintain the make and break device in position to interrupt the power interconnection will, at that time, effect such interruption, together with releasable means for maintaining the brake control member in brake-applied position.

ARTHUR H. C. A. RAWSON.